Oct. 15, 1957 S. E. TYSZKIEWICZ 2,810,017
ELECTRIC SYSTEM FOR CONTROLLING A MACHINE OR APPARATUS ADAPTED TO PERFORM A PLURALITY OF FUNCTIONS
Filed May 4, 1953
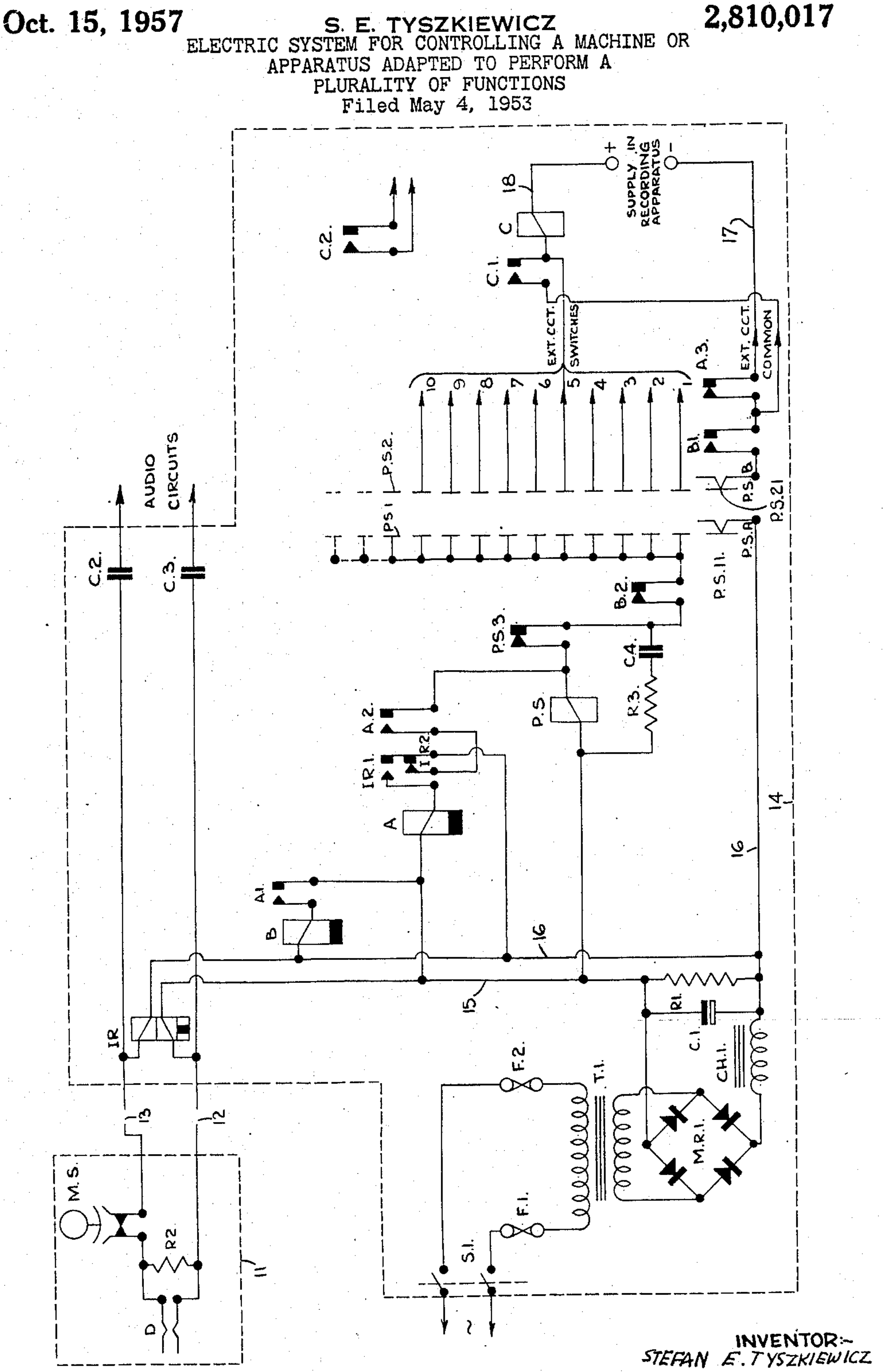
INVENTOR:- STEFAN E. TYSZKIEWICZ
BY:- [signature]
ATTORNEYS United States Patent Office 2,810,017

Patented Oct. 15, 1957

2,810,017

ELECTRIC SYSTEM FOR CONTROLLING A MACHINE OR APPARATUS ADAPTED TO PERFORM A PLURALITY OF FUNCTIONS

Stefan Eugene Tyszkiewicz, London, England

Application May 4, 1953, Serial No. 352,646

Claims priority, application Great Britain May 3, 1952

2 Claims. (Cl. 179—6)

This invention relates to electrical control mechanism and more particularly to electrical control mechanism in which control of a machine or apparatus is effected from a distance. This invention is intended particularly for the remote control and use of an electromagnetic sound recording and reproducing apparatus.

The main object of the invention is to allow any of a predetermined number of controls or operations of a machine or apparatus to be selected electrically from a distance and a more particular object is to enable an electromagnetic sound recording and reproducing apparatus to be controlled from a remote point by means of a standard telephone unit having a dial selector, the dial serving to select operations of the apparatus such as recording sound received from the microphone standard telephone unit or reproducing recorded sound into the ear piece of the standard telephone unit.

According to the present invention an electrical control system for the control of a machine or apparatus comprises a self holding relay controlling the operation of each function of the machine or apparatus, a rotary selector switch for energising any one of the self holding relays, a control for transmitting one or more electrical impulses in response to manual controlling action, a motor driving the selector switch so that the position selected and self holding relay energised depends on the number of impulses, and automatic means for returning the rotary selector switch to a rest position after predetermined delay from the time of actuation. The control for transmitting impulses preferably comprises the dial selector of an ordinary telephone unit whilst the rotary selector switch and motor preferably comprises a uniselector switch such as is extensively used in automatic telephone exchanges.

In order that the invention may be clearly understood one embodiment thereof will be described with respect to the accompanying drawing which shows a circuit diagram of the control apparatus using an ordinary telephone unit having a dial selector. This control is intended for use with an electromagnetic sound recording and reproducing apparatus.

In the drawing the telephone unit is represented by the dotted line enclosure 11 from which extends a pair of telephone lines 12 and 13 broken to indicate distance. In the telephone unit the essential elements for the operation of the control comprises handset switch M. S. whose contact is broken when the handset is resting in its cradle, a dial contact D operated by the dial giving a number of makes and breaks of contact in accordance with the amount that the dial is turned before release and a resistor R2 shunted across the contact D to ensure that it does not entirely break the circuit through the telephone unit when it operates. The telephone unit is a standard article and no further description is thought necessary. The dotted line 14 encloses the actual control apparatus for use with an electromagnetic sound recording and reproducing apparatus. The telephone wires 12 and 13 enter this apparatus and connection is made to them for control purposes by means of a high speed relay coil IR which comprises two windings so that energising current may be fed to each line through a winding having inductance so that no serious loss of audio frequency energy arises. Power supply for the control apparatus is of a conventional type and comprises a transformer T1 connected to a mains electricity supply through fuses $F_1$ and $F_2$ and switch S1, the transformer output being fed to a bridge rectifier MR1 whose D. C. output is smoothed by means of inductor CH1 and capacitor C.1. The smoothed D. C. output is connected to a positive output conductor and a negative common return conductor 16. A bleed resistor R.1 shunted across the D. C. output prevents peak voltage values being attained. The high speed relay has a pair of contacts I.R.1 and I.R.2 of which contact I.R.1 closes and contact I.R.2 opens on relay energisation. The contact operation overlaps in that during energisation or de-energisation of the high speed relay contacts I.R.1 and I.R.2 are simultaneously closed. Contact I.R.1 when closed allows flow of current from conductors 15 and 16 to a first delayed action relay having coil A controlling three contacts A1, A2 and A3 of which A1 and A2 are closed and A3 is opened on coil energisation. Contact A2 is connected in series with contact I.R.2 and together these contacts control flow of current from conductors 15 and 16 to a rotary switch coil P.S. A second delayed action relay having coil B is energised by contact A1. This second delayed action relay has contact B1 closing and contact B2 opening on coil energisation. The rotary switch has two rotary contact arms P.S.A. and P.S.B. that co-operate respectively with two banks of contacts P.S.1 and P.S.2. All the contacts in bank P.S.1 are connected together with the exception of contact P.S.11 at the switch rest position. Similarly contact P.S.21 in bank P.S.2 is not connected at the rest position. Contact P.S.3 is opened on energisation of coil P.S. and serves for automatic rotation of the rotary switch to the rest position when a circuit is completed from conductors 15 and 16 through arm P.S.A., connected to contacts P.S.1, contact B2, contact P.S.3 and coil P.S.

Each of contacts 1 to 10 of the bank P.S.2 of the rotary switch are connected to a separate self holding relay of which one connected to contact 5 is shown by the coil C and contacts C1 and C2 both of which are closed on energisation of coil C. Each of the other contacts 2 to 10 is connected to a similar self holding relay. The self holding relays are, in fact, part of the recording and reproducing apparatus and are supplied with energising current from that apparatus. The common return connection for this apparatus is shown by conductor 17 which is connected through contacts A.3 and B.1 to the rotary switch arm P.S.B. The coil C of the self holding relay is supplied by conductor 18 from the apparatus and the circuit through this coil is completed either through contacts 1, B.1 and A.3 or through contacts C.1 and A.3. Contacts C.2 when closed complete a circuit for causing a certain operation of the apparatus.

The operation is as follows.

When a particular operation is desired the dial of the telephone unit is rotated to the position representing that operation, for example the operation corresponding to the contact 5 of the rotary switch is desired. Initial rotation of the dial closes contact D to energise coil IR thus closing contact I.R.1 and opening contact I.R.2. Contact I.R.1 energises relay A to close contacts A.1 and A.2 and to open contact A.3. Contact A.1 energises coil B causing contact B.1 to close and B.2 to open. On releasing the dial it rotates back to its rest position opening and closing contact D five times. The high speed relay contacts I. R.1 and I.R.2 are opened and closed quickly five times but relay coils A and B remain energised due to their delayed action characteristic. Thus coil P.S. is supplied with five pulses of current which cause arms P.S.A. and P.S.B. to step around five positions. Arm P.S.A. is thus connected to a contact P.S.1 whilst arm P.S.B. is connected to contact 5. After the five impulses of contact D it remains open and relay coil I.R. becomes de-energised opening contact I.R.1 and closing contact I.R.2. Coil A is thus de-energised after its time delay has elapsed opening contacts A.1 and A.2 and closing contact A.3. Closure of this latter contact completes a circuit through coil C of the self holding relay contact B.1, arm P.S.B. and contact 5 thus energising this relay to close contact C.1 and C.2. Closure of contact C.1 completes a second circuit to energise coil C through contact A.3. Immediately an opening of contact A.1 circuit is broken through coil B and after its time delay has elapsed contact B.1 opens and contact B.2 closes. Opening of contact B.1 breaks circuit to coil C through arm P.S.B. and contact 5 but the holding circuit through contacts A.3 and C.1 remain so that contact C.2 remains closed to ensure that the particular operation of the apparatus continues. Closing of contact B.2 supplies current to contact P.S.B. and coil P.S. causing rotation of arms P.S.A. and P.S.B. until the arms reach the rest position when arm P.S.A. reaches contact P.S.11 and breaks the circuit to contact P.S.3 and coil P.S. Sparking at contact P.S.3 is suppressed by means of resistor R.3 and capacitor C.4. At the rest position the control is ready for further operation of the dial to initiate further control. Until such dial movement the operation controlled by contacts C.2 will continue. Directly the dial is rotated for a different operation and coils I.R. and A are energised contact A.3 is opened to break circuit through the contact C.1 to de-energise coil C and open contacts C.1 and C.2. Thus the particular operation controlled by contact C.1 is stopped. On releasing the dial a further operation will be selected as described above. All holding relays have the return circuit from the holding contacts passing through contact A.3 so that this contact may open any holding circuit. By means of the control described it is possible for a remote telephone to be used for recording and reproducing speech and assuming, for example, that a telephone exchange were to install a recording service any person such as a business man having a telephone could record memoranda, letters or the like for latter conversion into typescript. As far as recording or reproducing is concerned the telephone lines leading to the control are connected through blocking capacitors $C_2$ and $C_3$ to the recording apparatus and may carry speech either to or from the telephone unit. For this purpose of recording and reproducing the different movements possible with the dial may represent the following operations.

(1) Record speech from the telephone.

(2) Stop recording.

(3) Marking signal to mark recording medium at end of a particular letter or paragraph.

(4) Reproduce over the telephone the recorded speech from last marking signal.

Whilst the invention has been described with respect to a recording apparatus it will be appreciated that it may be employed for the control of any machine or apparatus. For example, the invention may be used for the remote control of mobile craft, such as aircraft, the telephone lines being replaced by a radio link. Also the invention may be used in wartime for the control of air-raid sirens from a remote position. A further example of the use of the invention is the control by a shop keeper of his shop window lighting from a remote position such as his home by means of the telephone.

In the described construction the rotary switch is conveniently of the kind known as a uniselector switch such as is used in numbers in automatic telephone exchanges.

I claim:

1. An electric system for controlling a machine or apparatus adapted to perform a plurality of functions respectively associated with sequential numbers from one to the number of functions having, in combination, a plurality of normally unenergized self-holding relays equal in number to the number of functions for controlling when energized the performance of the respective functions, a selector switch adapted normally to occupy a rest position and to become actuated to a plurality of active positions equal in number to the number of functions, means for effecting the energization of the respective relays upon the selector switch becoming actuated to the respective active positions, whereby the relays and also the active positions of the selector switch become associated with the respective sequential numbers, means operable upon the selector switch becoming actuated to an active position associated with any of the sequential numbers for energizing the relay that is associated with such sequential number, apparatus for transmitting electric impulses, means operable manually to effect the transmission by the transmitting apparatus of a predetermined number of electric impulses equal to any of the sequential numbers, means controlled by the transmitting apparatus for thereupon actuating the selector switch to the active position associated with the predetermined number in order to effect the energization of the relay associated with the predetermined number, thereby to effect the performance of the function associated with the predetermined number, means for returning the selector switch to the rest position at the end of a predetermined time after its actuation, the means controlled by the transmitting apparatus for actuating the selector switch to the active positions including a high-speed relay sensitive to the electric impulses and a first time-delay relay insensitive to the electric impulses, means operative on receipt of the electric impulses to cause the first time-delay relay to connect the high-speed relay to the selector switch, and means whereby the return of the selector switch to the rest position is under the control of the first time-delay relay.

2. An electric system as claimed in claim 1 including a second time-delay relay, means controlled by the first time-delay relay for actuating the second time-delay relay, and means whereby the actuation of the selector switch to the active positions is effected under the control of the second time-delay relay.

References Cited in the file of this patent

UNITED STATES PATENTS 2,200,351 Whitehead ------------- May 14, 1940